United States Patent
Mildner et al.

(10) Patent No.: US 9,873,470 B2
(45) Date of Patent: Jan. 23, 2018

(54) SUPPORT STRUCTURE COMPONENT FOR CONNECTING A SPRING STRUT TO A VEHICLE BODY, METHOD FOR MOUNTING A SPRING STRUT ON A VEHICLE BODY AND VEHICLE BODY

(71) Applicant: GM GLOBAL TECHNOLOGY OPERATIONS LLC, Detroit, MI (US)

(72) Inventors: Udo Mildner, Limburg (DE); Lothar Teske, Aschaffenburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/919,282

(22) Filed: Oct. 21, 2015

(65) Prior Publication Data

US 2016/0129747 A1    May 12, 2016

(30) Foreign Application Priority Data

Oct. 21, 2014   (DE) .................. 10 2014 015 539

(51) Int. Cl.
  *B62D 65/12*  (2006.01)
  *B62D 25/08*  (2006.01)
  *B60G 15/06*  (2006.01)

(52) U.S. Cl.
  CPC .......... *B62D 65/12* (2013.01); *B60G 15/068* (2013.01); *B62D 25/088* (2013.01); *B60G 2204/128* (2013.01); *B60G 2204/15* (2013.01)

(58) Field of Classification Search
  CPC .... B62D 65/12; B62D 25/088; B60G 15/068; B60G 2204/128; B60G 2204/15
  See application file for complete search history.

(56) References Cited

U.S. PATENT DOCUMENTS

| 5,344,187 | A  |   | 9/1994  | Kreis et al. |
| 5,375,870 | A  | * | 12/1994 | Smith ............... B60G 11/16 180/297 |
| 5,536,035 | A  |   | 7/1996  | Bautz et al. |
| 6,398,202 | B1 | * | 6/2002  | Schaible ........... B60G 13/003 188/321.11 |
| 7,789,429 | B2 |   | 9/2010  | Hampe et al. |
| 8,002,334 | B2 | * | 8/2011  | Bechtold ........... B62D 25/081 296/192 |

(Continued)

FOREIGN PATENT DOCUMENTS

DE    3716099 A1    1/1988
DE    10033712 A1   1/2002

(Continued)

OTHER PUBLICATIONS

German Patent Office, German Search Report for German Application No. 102014015539.0, dated May 28, 2015.

*Primary Examiner* — Drew J Brown
(74) *Attorney, Agent, or Firm* — Lorenz & Kopf, LLP (57) ABSTRACT

The present disclosure provides a support structure component for connecting a spring strut to a vehicle body. The support structure component includes a connection section for connecting to the vehicle body and at least one flange section having a spring strut mount configured to mount a spring strut. In this manner, the support structure component can be used for assembling the spring strut into the vehicle body without requiring significant access from above.

11 Claims, 10 Drawing Sheets

(56) References Cited

U.S. PATENT DOCUMENTS

| | | | |
|---|---|---|---|
| 8,727,380 B2* | 5/2014 | Akaki | B62D 21/02 |
| | | | 280/124.109 |
| 8,973,980 B2 | 3/2015 | Mildner et al. | |
| 9,039,072 B2 | 5/2015 | Mildner et al. | |
| 2008/0122146 A1 | 5/2008 | Herntier et al. | |
| 2012/0242055 A1* | 9/2012 | Starck | B62D 17/00 |
| | | | 280/124.145 |
| 2013/0249180 A1 | 9/2013 | Matsumura et al. | |
| 2014/0049019 A1* | 2/2014 | Ahn | B62D 21/09 |
| | | | 280/124.155 |

FOREIGN PATENT DOCUMENTS

| | | |
|---|---|---|
| DE | 102008050297 A1 | 5/2009 |
| DE | 102014011833 A1 | 3/2015 |
| GB | 2436862 A | 10/2007 |

\* cited by examiner

SUPPORT STRUCTURE COMPONENT FOR CONNECTING A SPRING STRUT TO A VEHICLE BODY, METHOD FOR MOUNTING A SPRING STRUT ON A VEHICLE BODY AND VEHICLE BODY

CROSS-REFERENCE TO RELATED APPLICATION

This application claims priority to German Patent Application No. 102014015539.0, filed Oct. 21, 2014, which is incorporated herein by reference in its entirety.

TECHNICAL FIELD

The invention relates to a support structure component for connecting a spring strut to a vehicle body. The invention furthermore relates to a vehicle body having such a support structure component. Furthermore, the invention relates to a method for mounting a spring strut on a vehicle body.

BACKGROUND

Support structure components of the type addressed herein are arranged for example in the region of the engine compartment of a motor vehicle and form a part of the motor vehicle body. The support structure components are usually designed as dome-shaped sheet metal components. The dome portion of the support structure component forms an upper end, which opens downwardly. The spring strut is installed by being pushed into the dome-sheet metal component and positioned from the bottom. Following this, the spring strut is attached to the dome portion of the support structure component. For this purpose, a threaded fastener attachment is usually employed which is attached to the dome-shaped support structure component from the top so that the spring strut is fastened against the bottom of the dome-shaped support structure component from top.

This results in that on the one hand the engine hood has to be opened up to now for attaching the spring strut to the vehicle body in order to perform the necessary threaded connection from the top. A further consequence is that the separating joint between the engine hood and the fender has to be configured so that the threaded portion for the spring strut on the dome-shaped support structure component of the vehicle body still remains accessible from the top. Because of this, flexibility in the development of new and/or improved configurations for motor vehicles is limited, for example with the consequence that the production process, the manufacturing costs and the repair friendliness of a motor vehicle can be negatively influenced.

SUMMARY

An embodiment of the invention is based on the object of proposing at least one possibility for connecting a spring strut to a vehicle body, by way of which the configuration freedom in the new development or further development of a motor vehicle less impaired than previously.

For solving the object, a support structure component is proposed for connecting a spring strut to a vehicle body with at least one connection section for connection to a vehicle body and with at least one flange section, which is designed for attaching a spring strut mount having a basic body on which a spring strut is mounted. In addition, a construction unit having a support structure component for connecting a spring strut to a vehicle body with at least one connection section for connection to a vehicle body and with at least one flange section, which is designed for attaching a spring strut mounting, on which a spring strut is mounted, and the vehicle body, in particular front car, having a side member, a longitudinal structure substantially running in longitudinal direction of the side member and the support structure component arranged in between, which is attached with a connection section on the side member and with another connection section on the longitudinal structure is proposed for solving the object. An assembly method for mounting a spring strut on a vehicle body provided with a support structure component, in particular a vehicle body, wherein the spring strut is first mounted on a spring strut mount and subsequently the spring strut mount together with the spring strut is brought into attaching position against the support structure component from the bottom and then attached to the support structure component from the bottom is proposed furthermore for solving the object. Advantageous configurations are obtained from the claims, the following description and the figures.

According to an embodiment of the invention, a support structure component for connecting a spring strut to a vehicle body includes at least one connecting section for connection to a vehicle body, for example for connection to a side member and/or a wheel installation brace. The support structure further includes at least one flange section, which is designed for attaching a spring strut mount, on which a spring strut is mounted, for example by an end of the spring strut being received and in particular attached in the spring strut mount. The flange section includes at least one connecting section, on which a spring strut mount can be received and/or attached.

By way of the support structure component the spring strut is not directly mounted to the vehicle body. By way of the support structure component, a body component is realized which although interacting with the spring strut mount via the flange section, to which however the spring strut mount can only be attached following its attachment to the vehicle body. In this regard, the support structure component makes possible that pushing the spring strut into the spring strut mount and any fastening of the spring strut against the spring strut mount is carried out outside the vehicle body, i.e. spatially separately from the support structure component. Because of this, a vehicle body provided with the support structure component need no longer be configured accessible from the outside for attaching the spring strut. In this regard, great configuration freedom results from this in the new development or further development of a motor vehicle.

Opportunity offers that the flange section is designed for the materially joined, non-positively joined and/or positively joined connecting of the spring strut mounting. Because of this, permanently durable attaching of the spring strut mounting to the support structure component is possible in a flexible manner.

For example, at least one connector is provided on the support structure component in the region of the flange section, against which a counter-connecting member can be brought into operational connection subject to connecting the spring strut mount. Because of this, the spring strut mount is easy to attach to the support structure component since the connecting member is already arranged thereon. This favors that the counter-connecting member is also brought against the connection member in regions of the vehicle body with difficult access, in particular when the connection member is held at least assembly-fixed on the support structure component.

In a technically simple manner, the spring strut mount can be connected to the support structure component when, according to a configuration of the present disclosure, the connection member is a thread-guiding part, which can be brought into operational connection against the counter-connection member by threaded fastening. For example, the connection member is a nut, in particular weld nut, which is arranged fixed on the support structure, for example welded to the same so that for attaching the spring strut mount a threaded fastener such as a screw or bolt can be utilized as counter-connection member. In the case of a vehicle body provided with the support structure component, assembly of the spring strut mount on the support structure component from beneath, for example from the below the engine compartment, is facilitated.

According to a further configuration of the present disclosure it is provided that the support structure component is formed by a shell structure having at least two shells or includes such a shell structure. By way of this two or multi-part structure, an adequately durable body structure is formed with relatively little use of material in order to withstand forces acting via the mounted spring strut.

According to a further configuration of the present disclosure one of the shells forms or includes a wheel housing section and the other shell serves as reinforcing structure, for example for the wheel housing section, aims in the same direction.

To further reinforce or stiffen the support structure component opportunity offers that according to a further configuration of the present disclosure the shells are structurally connected to one another subject to forming at least one hollow profile, wherein the at least one hollow profile with its longitudinal extension extends transversely to the longitudinal extension of the preferentially elongated connection section.

A further configuration of the present disclosure provides shells that are structurally connected to one another subject to forming at least two hollow profiles, wherein between the hollow profiles, in particular in the direction of their longitudinal extension, the support structure component has a passage opening for receiving an end of a spring strut. Because of this, effective bending stiffening of the support structure component is realized in the region of the passage opening. Any acting transverse forces are thereby effectively counteracted.

The passage opening is realized in a technically simple manner when according to a configuration of the present disclosure the shells include a passage opening each, wherein the passage openings are substantially arranged aligned or congruent with one another.

It can be provided that the at least one connecting member is arranged in the region of the at least one hollow profile and the hollow space of the hollow profile is bridged by a sleeve element, which serves for receiving a counter-connection member that can be brought into operational connection with the connection member. Because of this, the hollow profile in the region of one or multiple connecting points for attaching the spring strut mount on the support structure component is stiffened so that weakening of the hollow profile for example because of a compression of the hollow space during the attaching of the spring strut mount on the support structure component is avoided.

The present disclosure further includes a spring strut mount for attaching to the flange section of the support structure component described above or a support structure component of the type described above. The spring strut mount has a basic body, on which a spring strut for a motor vehicle, for example a McPherson spring strut can be mounted. The spring strut mount is a separate component, which is designed for assembly to the support structure component. Because of this, a high degree of flexibility for mounting a spring strut to an associated vehicle body is achieved, so that a high degree of configuration freedom is obtained in the further development or new development of motor vehicles. For example, the spring strut can be mounted on the support structure component even before mounting the spring strut mount or the mounting of the spring strut to the basic body can take place only after the mounting on the spring strut mount on the support structure component.

Opportunity offers that the basic body is substantially designed dome-shaped. Because of this, improved force absorption from the spring strut to the vehicle body is attained. Dome-shaped is to mean in particular that the basic body is substantially designed in a semi-spherical shape and/or bell-shaped.

Opportunity offers, further, that in the region of the open end of the basic body at least one connecting section projecting towards the outside is provided, so that the basic body can be introduced into the support structure component through a passage opening and the connection section serves as stop against the support structure component. In particular, the dimensions of the basic body to this end substantially correspond to those of the passage opening. Because of this, connecting the spring strut mount to the support structure component can be realized in a technically simple manner wherein at the same time the spring strut mount projects out of the support structure component dome-like and thereby optimal force introduction from the spring strut via the spring strut mount to the support structure component and thus to the vehicle body is attained.

Opportunity offers, further, that the spring strut mount includes a metal die casting, in particular light metal die casting or includes such components. Because of this, the spring strut mount is relatively light in weight, adequately stable and can be realized relatively cost-effectively with adequate production tolerance.

Advantageously, the spring strut mount can include a rib structure. By way of the rib structure, a further measure for stiffening the spring strut mount is realized.

A possible configuration of the present disclosure consists in that the basic body includes a passage opening, for example in its bottom, so that an end of a spring strut can be inserted and screwed against the rimming of the passage opening. Because of this, connecting the spring strut to the spring strut mount is possible in a technically simple manner.

Alternatively it can also be provided that the basic body includes at least one, but preferably multiple projections, for example domes, on which a spring strut can be connected by means of screw attaching. For example, the projections can be provided with an attaching thread, in particular an attaching thread cut in thereon. Insofar as the spring strut mount includes a rib structure it can be provided that the projections for connecting the spring strut are connected to the rib structure in order to stabilize the spring strut mount in the region of the attaching points for the spring strut.

Furthermore, the present disclosure includes a construction unit, in particular preassembled construction unit, with the spring strut mount described above or a spring strut mount of the type described above and a spring strut, for example a McPherson spring strut. In particular, the spring strut includes a shock absorber element, in particular a rod-shaped shock absorber element, and a spring element. In particular, the shock absorber element is mounted on the spring strut mount and the spring element supports itself against the spring strut mount. For example, the spring element is formed by a coil spring, which is put over the shock absorber element. By way of the construction unit, mounting the spring strut to a vehicle body including a support structure component of the type described above can be carried out in a simple manner, in particular the spring strut can thereby be mounted to the vehicle body from the bottom with little assembly effort.

In addition to this, the present disclosure includes a vehicle body, in particular a front car, with a side member, a longitudinal structure running substantially in longitudinal direction of the side member and a support structure component of the type described above or the support structure component described above arranged in between, which with a connecting section is attached to the side member and with another connecting section to the longitudinal structure. Because of this, the vehicle body is adequately stiffened in the region of the installation of a spring strut so that forces acting via the spring strut on the support structure can be optimally absorbed by the vehicle body. The longitudinal structure is formed for example by way of a wheel installation brace.

According to a configuration of the present disclosure it is provided that the support structure component is attached to the vehicle body in such a manner that the construction unit described above or a construction unit of the type described above can be brought into attaching position against the support structure component from the bottom and in particular can also be attached to the support structure component from the bottom. This results in a facilitation during the assembly of the motor vehicle since both inserting into the attaching position as well as the attaching proper is effected from one side. Any assembly steps from the top, for example by way of the engine compartment opening, are avoided. Because of this a major configuration freedom of the motor vehicle in the region of the engine hood and of the fender is attained since in the configuration any assembly access into the engine compartment from the top, for example for attaching the spring strut, is no longer necessary.

The present disclosure also includes a method for mounting a spring strut of a vehicle body provided with the support structure component described above or provided with a support structure component of the type described above, in particular the vehicle body described above or a vehicle body of the type described above. With the method, the spring strut is first mounted on a spring strut mount, for example the spring strut mount described above or a spring strut mount of the type described above and the spring strut mount together with the spring strut is subsequently brought into attaching position against the support structure component from below and then attached on the support structure component from below. By way of the method, any assembly access from the top for example in the engine compartment, for attaching the spring strut, is no longer necessary. This produces major configuration freedom in the new development or further development of motor vehicles.

Further objectives, advantages, features and application possibilities of the present invention are obtained from the following description of an exemplary embodiment.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
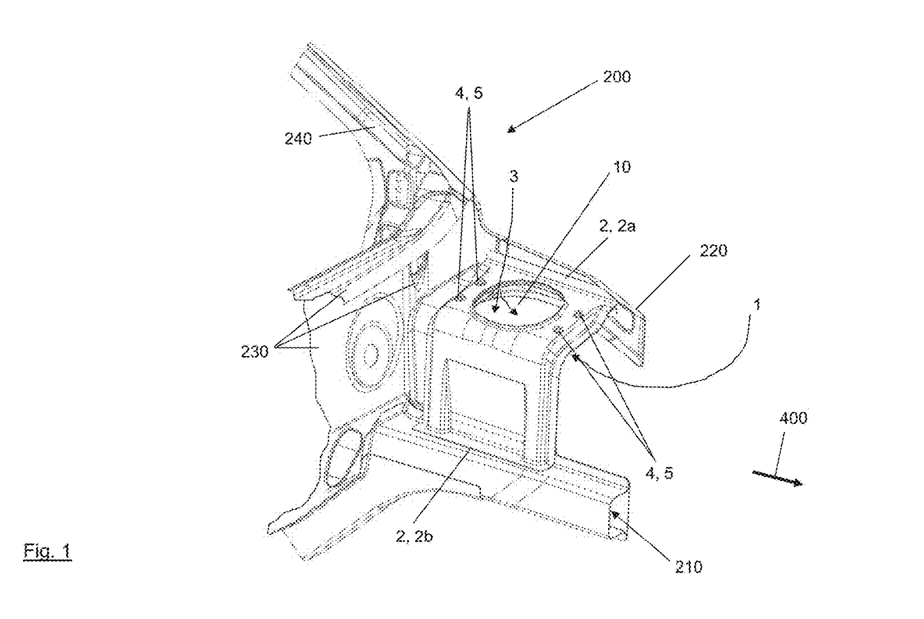
FIG. 1 illustrates a possible embodiment of a vehicle body, shown on the example of a region of the left side of the front car in a perspective view, wherein the vehicle body is provided with a support structure component for connecting a spring strut.

FIG. 1 shows—in schematic representation—a possible embodiment of a vehicle body 200, which is exemplarily shown in the region of the left side of its front car. From FIG. 1, a side member 210 of the vehicle body 200 and a longitudinal structure 220 extending spaced from the same is visible. The side structure 220 can be a wheel installation brace. Furthermore, a front wall 230 is at least partially visible from FIG. 1, which extends transversely to the side member 210 and the longitudinal structure 220 and can merge into a lateral front wall 240 on the outside.

The side member 210 and the longitudinal structure 220 seen in forward driving direction 400 form a receiving space for one of the wheels of the motor vehicle in the region in front of the front wall 230. In order to be able to mount a spring strut (not shown in FIG. 1) to the vehicle body 200, a support structure component 1 is provided, which is connected to the vehicle body 200 by means of at least one connection section 2. For example, the support structure component 1 can include two connection sections 2a and 2b, wherein the one connection section 2a is structurally connected to the longitudinal structure 220 and the other connection section 2b to the side member 210, in particular by means of welding, riveting, clinching and/or bonding. The support structure component 1 extends between the connection sections 2a and 2b substantially transversely to the longitudinal extension of the vehicle body 200, i.e. transversely to the forward driving direction 400 and bridges the region between the side member 210 and the longitudinal structure 220 seen in forward driving direction 400, in front of the front wall 230.

The support structure component 1 further includes at least one flange section 3, which is designed for attaching a spring strut mount (not shown in FIG. 1). For attaching the spring strut mount, at least one connection member 4 can be arranged on the support structure component 1, in particular arranged in a fixed manner. The connection member 4 can be a screw element 5, for example a weld nut, which is preferentially arranged in the installation state of the support structure component 1 top side so that a counter-connection member (not shown in FIG. 1) can be screwed from the bottom into operational connection with the connection member 4 or into the screw element 5 and the attaching of the spring strut mount from the bottom on the support structure component 1 thereby takes place from the bottom.

The concept described here is based on the idea of providing a spring strut mount as a separate component to the support structure component 1, so that the spring strut mount can be mounted on a spring strut in advance independently of the spring strut mount 1 and subsequently the spring strut mount mounted together with the spring strut on the support structure component 1 already attached to the vehicle body 200. The spring strut is therefore only mounted on the vehicle body 200 via the spring strut mount. The spring strut mount together with the spring strut can be brought into attaching position on the support structure component 1 from the bottom and subsequently also attached on the support structure component 1 from the bottom. A possible configuration of the support structure component 1 and a possible configuration of the associated spring strut mount is shown in the further figures and described in the following.

Figure 2:
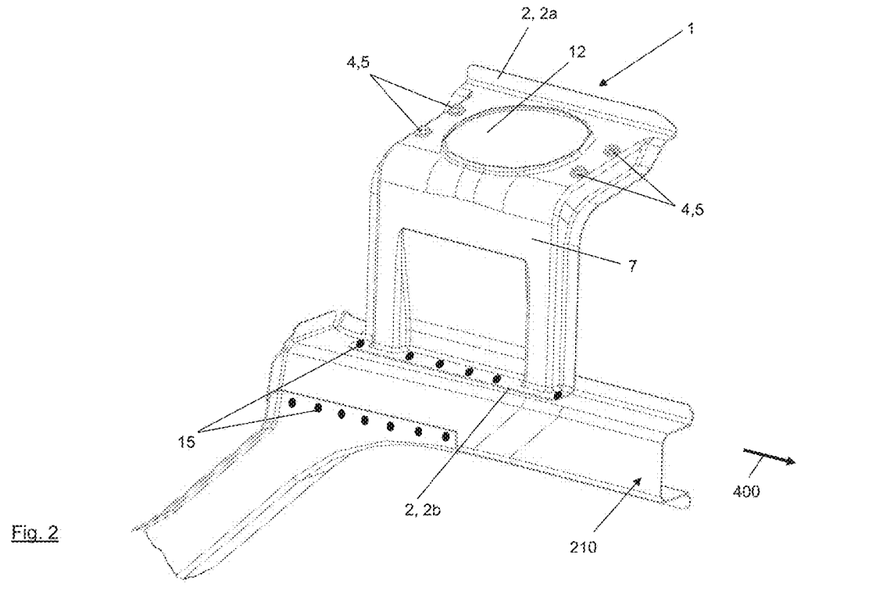
FIG. 2 shows an upper shell of the support structure component according to FIG. 1, mounted on a side member of the vehicle body according to FIG. 1, in perspective view.
Figure 3:
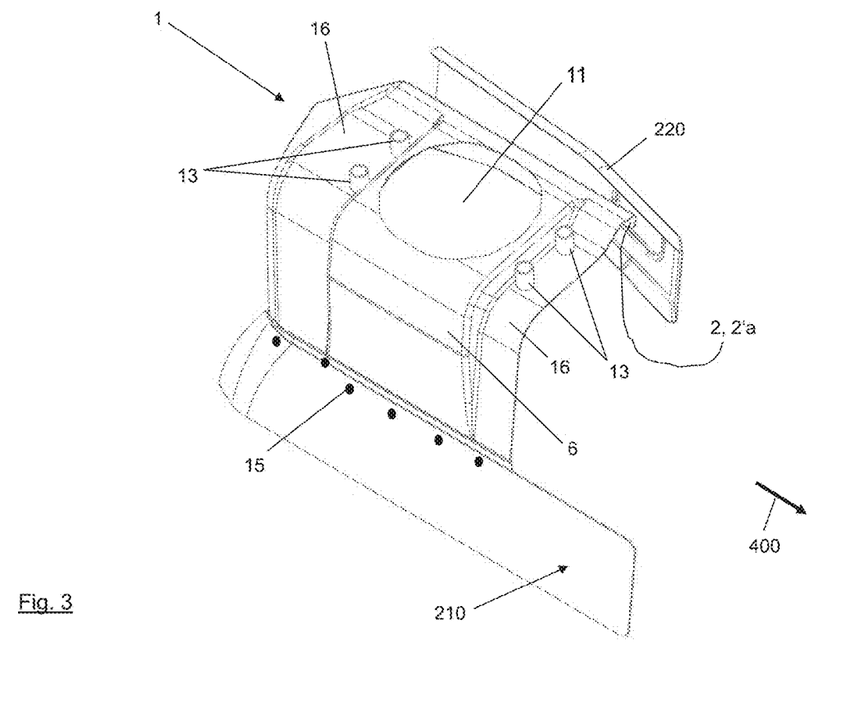
FIG. 3 shows a lower shell of the support structure component according to FIG. 1 in perspective view, which on the one hand is mounted on a closing plate for the side member according to FIG. 2 and on the other hand on a wheel installation brace.
Figure 4:
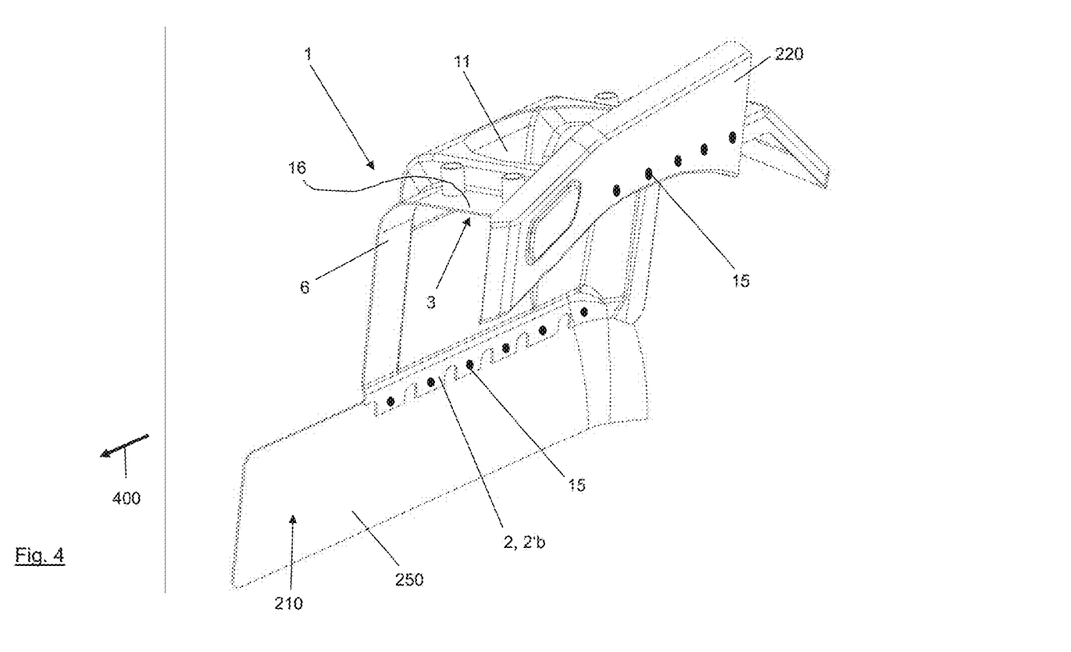
FIG. 4 shows the lower shell together with the closing plate and the wheel installation brace according to FIG. 3 in another perspective view.

Preferably, the support structure component 1 is formed by a shell structure having at least two shells 6 and 7 or includes such a shell structure. FIGS. 2, 3 and 4 show the construction of the support structure component 1 with such a shell structure. FIG. 2 shows the support structure component 1 with the shell 7, which in the installation state on the vehicle body 200 preferably forms the shell located at the top. The connection sections 2*a* and 2*b* evident from FIG. 1 are arranged on the shell 7. The at least one connection member 4 is also arranged on the shell 7.

FIGS. 3 and 4 show the support structure component 1 with its other shell 6, which in the installed state on the vehicle body 200 preferably forms the shell located at the bottom with respect to the shell 7. Preferably, the shell 6 at its ends directed to the side member 210 and the longitudinal structure 220 forms a separate connection section 2'*a* and 2'*b* each. By means of the connection section 2'*a*, the shell 6 can be structurally connected or is structurally connected to the longitudinal structure 220. The shell 6 can be structurally connected or is structurally connected with the connection section 2'*b* to the side member 220, preferentially to the closing plate 250 of the side member 210. For example, the connection sections 2'*a* and 2'*b* of the shell 6 and the connection sections 2*a* and 2*b* of the shell 7 are attached on the side member 210 and the longitudinal structure 220 by means of multiple, preferentially concentrated structural connections 15, such as for example spot welds.

The shells 6 and 7 face one another with one of their flat sides each and lie on top of one another with their respective flat sides. The shell 6 located at the bottom preferably forms a wheel installation structure, in particular a wheel installation plate, and the shell 7 located above that, serves as reinforcing structure for reinforcing the shell 6.

To further stiffen the support structure component 1 it can be provided that the shells 6 and 7 are connected to one another subject to forming at least one hollow profile, wherein the hollow profile with its longitudinal extension extends transversely to the longitudinal extension of the connection section 2 of the support structure component 1. The at least one hollow profile is evident from the sectional representation in FIG. 9 and there marked with the reference number 8 and 9 respectively. The hollow profile 8 and 9 respectively can be formed by a set-off flat region 16 on one of the shells 6 and 7, for example of the shell 6, and a side wall region of the other shell corresponding therewith, for example the shell 7, which is evident with the help of FIGS. 2, 3 and 4.

Figure 9:
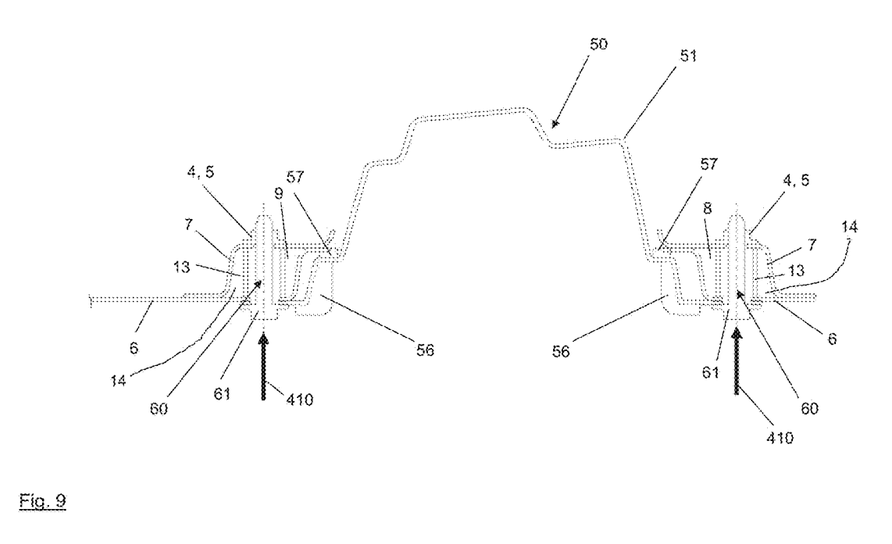
FIG. 9 is a further sectional representation of the vehicle according to FIG. 7 along the section line B-B.

Preferably, the support structure component 1 includes two such hollow profiles 8 and 9, which are preferably arranged in the lateral end region of the support structure component 1 and a passage opening 10 is provided on the support structure component 1 in between (FIG. 9). Preferably, the passage opening 10 is formed by a passage opening 11 in the shell 6 and a passage opening 12 in the shell 7 which substantially corresponds therewith. The passage opening 10 of the support structure component 1 serves for receiving a part of a spring strut mount (not shown in the FIGS. 2 to 4).

As is evident in particular from FIG. 2, the at least one connection member 4 can be arranged in the region of one of the hollow profiles 8 and 9 respectively of the support structure component 1. For bridging the hollow space of the respective hollow profile 8 and 9 at least one associated sleeve element 13 is preferably provided, so that a counter-connection member passed through the sleeve element 13, which enters into operational contact against the connection member 4 of the support structure component 1, can be brought into attaching position without the hollow space of the associated hollow profile 8 and 9 respectively being thereby compressed and unintentionally deformed.

Figure 5:
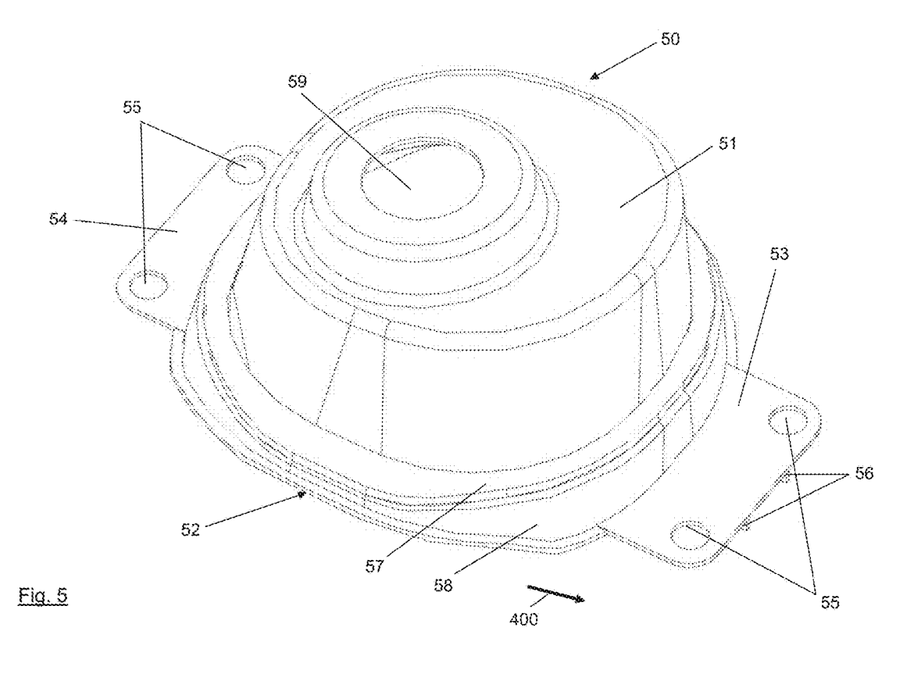
FIG. 5 illustrates a possible embodiment of a spring strut mount for attaching to the support structure component according to the FIGS. 1 to 4 in a perspective view.

FIG. 5 shows a possible embodiment of a spring strut mount 50, which is designed for attaching on the support structure component 1 and includes a basic body 51, in order to be able to mount a spring strut for a motor vehicle (not shown in the FIG. 5) thereon.

Preferably, the basic body 51 is designed dome-like and at its open end 52 includes at least one, preferentially two connection sections 53 and 54 projecting towards the outside opposite to one another so that the basic body 51 can be pushed in through the passage opening 10 in the support structure component 1 and the connection sections 53 and 54 serve as stop against the support structure component 1.

Preferably, the connection sections 53 and 54 each include at least one passage hole by means of which the spring strut mount 50 can be attached on the support structure component 1, preferentially on the connection sections 2 provided there. For example, the passage openings 55 serve for receiving a counter-connection member (not shown in FIG. 5), which is inserted through the respective associated passage hole 55 in order to be able to enter into operational contact with the connection member 4 that is present on the support structure component 1.

The connection sections 53 and 54 can each include at least one rib or similar rib structure 56, through which the attaching region of the spring strut mount 50 is further stiffened for connection to the support structure component 1.

A sealing element 57 can also be provided, which is designed for example as a ring seal and in its center at least partially receives the basic body 51 and preferably supports itself against an edge section 58 projecting towards the outside on the open end 52 of the spring strut mount 50 or is supported thereon. Preferably, the edge section 58 is circumferential and serves for the further reinforcement of the spring strut mount 50. By means of the sealing element 57, the spring strut mount 50 is sealed towards the outside in the installed state on the support structure component 1. For example, the wheel arch that is present in the region of the spring strut is sealed relative to the engine compartment so that while driving no splash water from the tires can enter the engine compartment.

The spring strut mount 50 can include a passage opening 59 in the region of its bottom, into which an end of a spring strut (not shown in FIG. 5) can be pushed, for example in order to utilize the passage opening 58 for attaching the spring strut on the spring strut mount 50.

Figure 6:
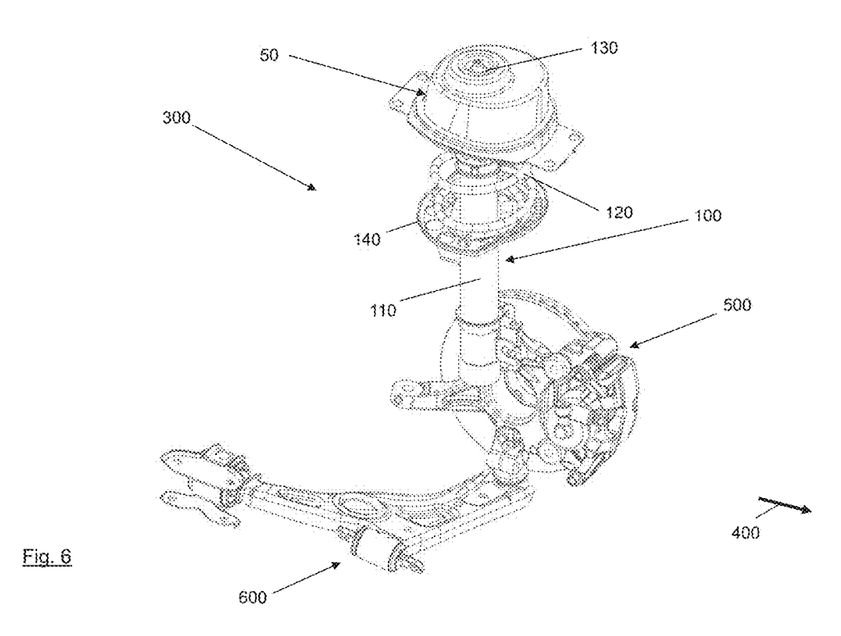
FIG. 6 illustrates the spring strut mount according to FIG. 5 with a spring strut mounted thereon and further attachment parts of a braking device and a steering device of a motor vehicle in a perspective representation.

FIG. 6 shows the spring strut mount 50 with a spring strut 100 mounted thereon. The spring strut 100 and the spring strut mount 50 preferably form a preassembled construction unit 300.

Preferably, the spring strut 100 includes an elongated shock absorber element 110 and a spring element 120. The spring element 120 can be a coil spring, into the interior of which the shock absorber element 110 is pushed in or pushed through. For example, the spring strut 100 is a McPherson spring strut.

As is evident from FIG. 6, the spring element 120 can support itself towards the bottom against a spring retainer 140, which is arranged for example on the shock absorber element 110 fixed on the housing.

Preferably, the spring strut 100 is pushed in through the passage opening 59 in the spring strut mount 50 in particular with an end of the shock absorber element 110 and screwed against the rimming of the passage opening 59 by means of a thread element 130 such as for example a attaching nut.

The construction unit 300 with the spring strut mount 50 and the spring strut 100 can additionally include at least one component of a braking device 500 and/or a steering device 600 and form a preassembled construction unit. In a later assembly step, this construction unit can be mounted on the vehicle body 200, wherein the spring strut mount 50 is attached on the support structure component 1 of the vehicle body 200.

Figure 7:
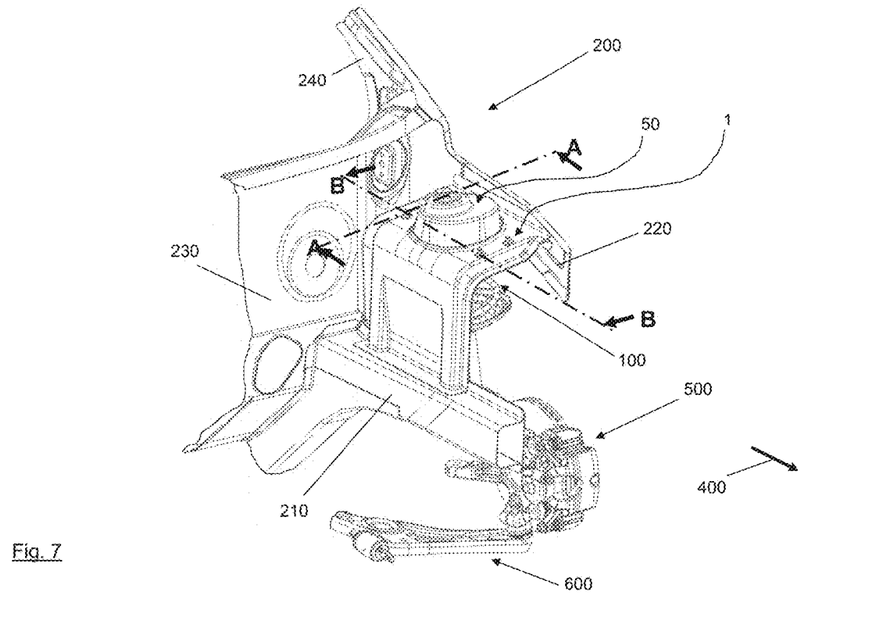
FIG. 7 illustrates the vehicle body according to FIG. 1 with a spring strut mount mounted on the support structure component, on which the spring strut and the attachment parts according to FIG. 6 are mounted, in a perspective view.
Figure 8:
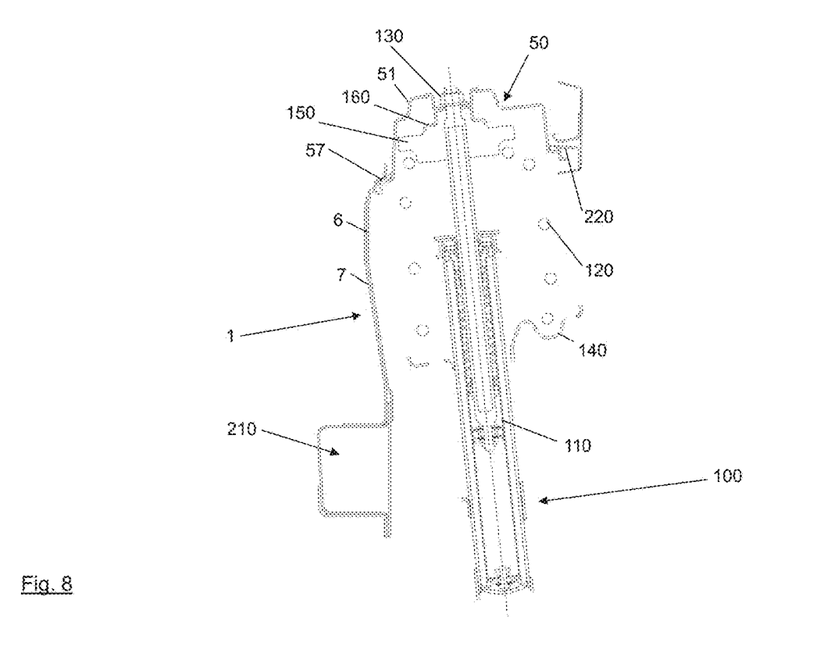
FIG. 8 shows the region of the motor vehicle according to FIG. 7 in sectional representation along the section line A-A.

FIG. 7 shows the construction unit 300 according to FIG. 6 with the components of the braking device 500 and steering device 600 in the assembled state on the vehicle body 200, wherein the spring strut mount 50 is attached on the support structure component 1. FIG. 8 shows the assembly according to FIG. 7 in a sectional representation along the section line A-A of FIG. 7. FIG. 8 shows the assembly of FIG. 7 in a sectional representation along the section line B-B of FIG. 7.

As is evident from FIG. 8, the spring strut 100 on its upper end is inserted in the passage opening 59 of the spring strut mount 50 and screwed against the spring strut mount 50 and screwed against the basic body 51 by means of the thread element 130. As is additionally evident from this, the spring element 120 can be supported on a buffer element 150 towards the top, wherein the buffer element 150 in turn can support itself against the thread element 130 via a support bearing element 160.

The sectional representation in FIG. 9 shows the design of the hollow profiles 8 and 9 from the shells 6 and 7 of the support structure component 1. For attaching the spring strut mount 50 on the support structure component 1, a counter-connection member 60 each is brought into operational contact with the associated connection member 4. Provided that the connection member 4 is designed as a screw element 5, the counter-connection member 60 is designed as a counter-screw element 61, which inserted in the associated sleeve element 13 is screwed into the screw element 5. The respective sleeve element 13 in this case bridges a hollow space 14 formed by the hollow profile 8 and 9 respectively.

As is evident from viewing FIG. 9 together with FIG. 7, the spring strut mount 50 is pushed into the support structure component 1 from the bottom, in particular its passage opening 10 and positioned. In addition to this, the spring strut mount 50 is also attached to the support structure component 1 from the bottom. To this end, the counter-connection member 60 is brought into operational contact against the connection member 4 from the bottom in the direction of the respective arrow 410. Provided the connection member 4 and the counter-connection member 60 form a screw connection, the feed direction for screwing in the counter-connection member 60 is the movement direction according to the arrow 410.

Figure 10:
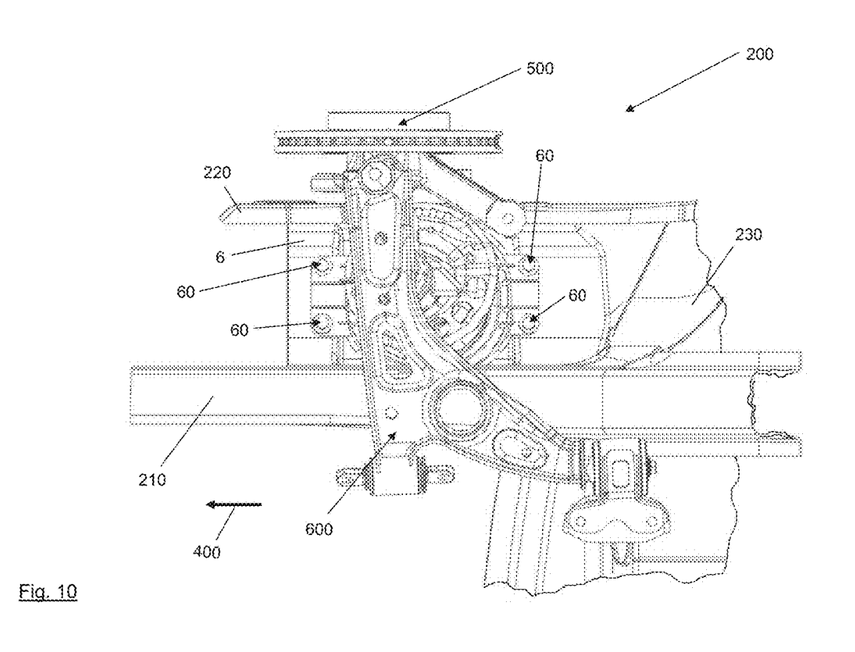
FIG. 10 shows the region of the motor vehicle according to FIG. 7 in a view from below.

FIG. 10 shows the construction according to FIG. 7 in a view from the bottom. As is evident from this, the counter-connection member 60 is accessible from the bottom.

Although the invention was described by means of an exemplary embodiment it is to be understood that a plurality of variants exist. It should also be noted that the exemplary embodiment or the exemplary embodiments are only examples and not intended to restrict the scope of protection, the applicability or executability or the construction in any way. The above description provides the person skilled the art with a suitable instruction for implementing or carrying out at least one embodiment; it is to be understood that various changes in the function and arrangement of elements or components, which are described above in at least one exemplary embodiment, can be made without deviating from the scope of protection of the following claims and their legal equivalents.

LIST OF REFERENCE NUMBERS

1 Support structure component
2 Connection section
2*a* Connection section
2*b* Connection section
2'*a* Connection section
2'*b* Connection section
3 Flange section
4 Connection means
5 Screw element
6 Shell
7 Shell
8 Hollow profile
9 Hollow profile
10 Passage opening
11 Passage opening
12 Passage opening
13 Sleeve element
14 Hollow space
15 Structural connection
16 Set-off region
50 Spring strut mounting
51 Basic body
52 Open end
53 Connection section
54 Connection section 55 Passage hole
56 Rib structure
57 Sealing element
58 Edge section
59 Passage opening
60 Counter-connection means
61 Counter-screw element
100 Spring strut
110 Shock absorber element
120 Spring element
130 Thread element
140 Spring retainer
150 Buffer element
160 Support element
200 Vehicle body
210 Side member
220 Longitudinal structure
230 Front wall
240 Lateral front wall
250 Closing plate
300 Construction unit
400 Forward driving direction
410 Arrow
500 Braking device
600 Steering device

What is claimed is:

1. A vehicle body comprising a side member, a longitudinal structure substantially running in longitudinal direction of the side member, and a support structure component for connecting a spring strut to the vehicle body arranged therebetween and attached with a side member connection section on the side member and with a longitudinal structure connection section on the longitudinal structure, the support structure component comprising:
 a support structure connection section configured to connect to the vehicle body, the support structure connection section having a flange section formed on a lower portion of the support structure connection section;
 a spring strut mount attached to the flange section and configured to mount the spring strut; and
 a shell structure having at least two shells connected together to form a hollow profile having a longitudinal extension which extends transversely to the longitudinal extension of the support structure connection section.

2. The vehicle body according to claim 1, wherein the flange section is configured to connect with the spring strut mount in at least one of a materially joined manner, a positively joined manner and a non-positively joined manner.

3. The vehicle body according to claim 1, further comprising a connection member provided on the support structure connection section in the region of the flange section, and a counter-connection member provided on the spring strut mount and in operational connection with the connection member.

4. The vehicle body according to claim 1, wherein a first shell forms a wheel housing section and a second shell forms a reinforcing structure.

5. The vehicle body according to claim 1, wherein the at least two shells are connected together to form at least two hollow profiles, wherein between the two hollow profiles the support structure component has a passage opening configured to receive an end of the spring strut.

6. The vehicle body according to claim 1, wherein the connection member is arranged in the region of the hollow profile and a hollow space of the hollow profile is bridged by a sleeve element, which serves for receiving a counter-connection member that is brought into operational connection with the connection member.

7. A spring strut mount for attaching to the flange section of the support structure component of the vehicle body according to claim 1 with a basic body on which the spring strut for a motor vehicle is mounted.

8. The spring strut mount according to claim 7, wherein the basic body comprises a dome shape having at least one basic body connection section at an open end of the basic body projecting towards the outside, so that the basic body is introduced through a passage opening in the support structure component and the basic body connection section serves as a stop against the support structure component.

9. An assembly unit with the spring strut mount according to claim 7 and the spring strut comprising a shock absorber element and a spring element, wherein the shock absorber element is mounted on the spring strut mount and the spring element supports itself against the spring strut mount.

10. The vehicle body according to claim 1, wherein the support structure component is attached on the vehicle body in such a manner that an assembly unit is brought into attaching position against the support structure component from the bottom and is attached to the support structure component from the bottom.

11. A method for mounting a spring strut on the vehicle body provided with the support structure component according to claim 1, wherein the spring strut is first mounted on the spring strut mount, and subsequently the spring strut mount together with the spring strut is brought into attaching position against the support structure component from the bottom and then attached to the support structure component from the bottom.

* * * * *